Figure 1:
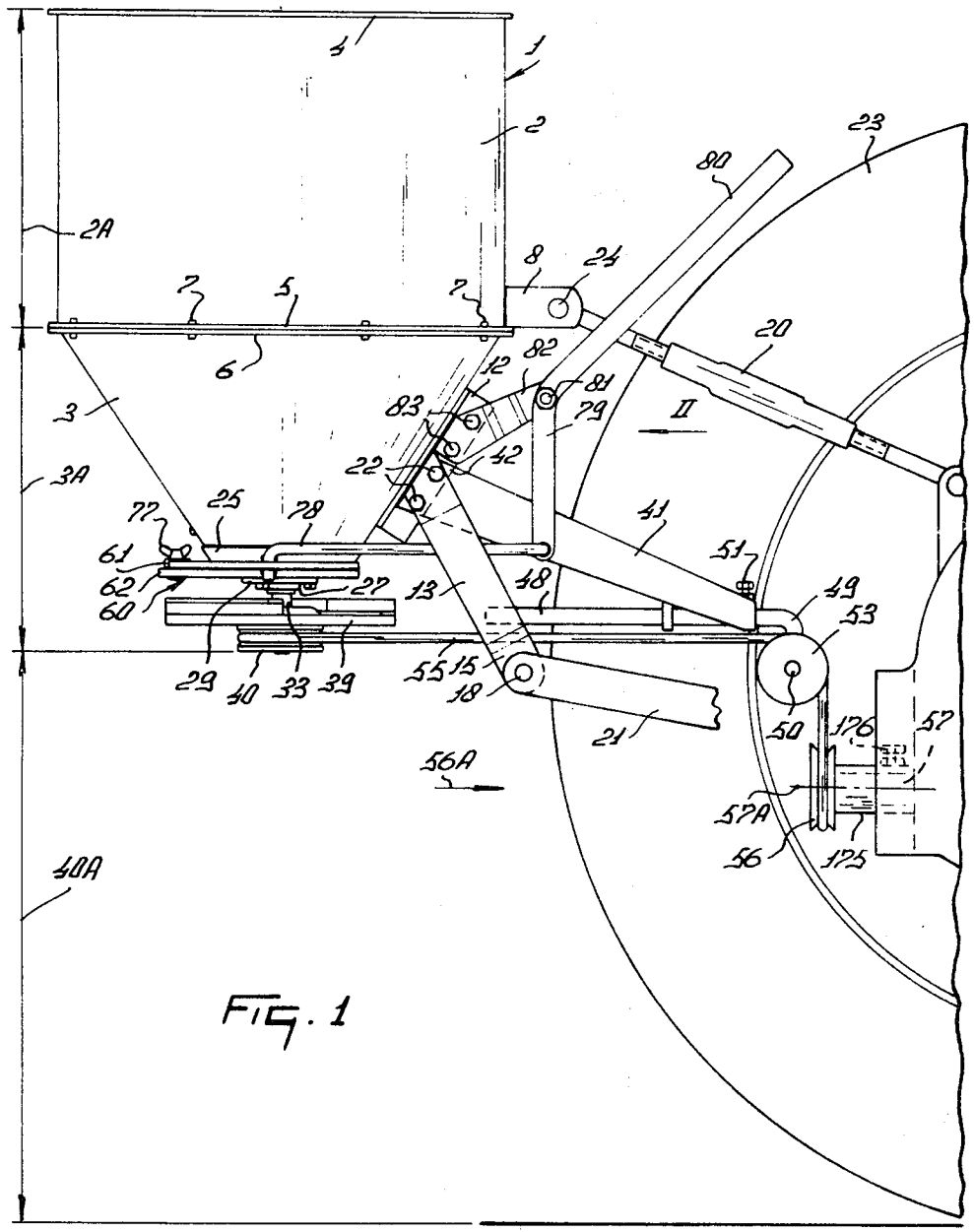

United States Patent [19]
van der Lely et al.

[11] 3,899,138
[45] Aug. 12, 1975

[54] SPREADING IMPLEMENTS

[76] Inventors: Ary van der Lely, 10, Weverskade, Maasland; Cornelis Johannes Gerardus Bom, 36, Esdoornlaan, Rozenburg, both of Netherlands

[22] Filed: Jan. 7, 1970

[21] Appl. No.: 1,199

[30] Foreign Application Priority Data
Jan. 17, 1969  Netherlands...................... 6900782
Jan. 17, 1969  Netherlands...................... 6900783

[52] U.S. Cl................. 239/661; 222/178; 239/670
[51] Int. Cl............................................. A01c 19/00
[58] Field of Search .......... 239/681, 684, 687, 661, 239/685, 653, 689, 670; 222/178, 176, 177, 215, 107, 105; 206/46; 111/63, 24, 74, 75; 150/1, 50, 49, 51

[56] References Cited
UNITED STATES PATENTS

| | | | |
|---|---|---|---|
| 532,632 | 1/1895 | Becker.................................. | 150/51 |
| 649,953 | 5/1900 | Rinderknecht ..................... | 239/653 |
| 664,147 | 12/1900 | Harth, Jr.............................. | 150/49 |
| 1,951,825 | 3/1934 | Ferris................................... | 206/46 |
| 2,538,886 | 1/1951 | Skibbe et al........................ | 239/661 |
| 2,615,596 | 10/1952 | Blue.................................. | 222/178 X |
| 2,652,261 | 9/1953 | Presler................................. | 239/661 |
| 2,882,060 | 4/1959 | Speicher.............................. | 239/687 |
| 2,901,257 | 8/1959 | Teagle ................................. | 239/661 |
| 2,907,508 | 10/1959 | Pride.................................. | 150/51 X |
| 3,131,832 | 5/1964 | Strandberg et al. ............. | 222/107 X |
| 3,206,076 | 9/1965 | Brackett .............................. | 222/105 |
| 3,220,740 | 11/1965 | Kavan et al...................... | 239/687 X |
| 3,279,801 | 10/1966 | Meyer.................................. | 239/687 |
| 3,318,486 | 5/1967 | Felix................................ | 222/176 X |

*Primary Examiner*—Evon C. Blunk
*Assistant Examiner*—James M. Slattery
*Attorney, Agent, or Firm*—Mason, Mason & Albright

[57] ABSTRACT

A spreading implement including a hopper or container which can be divided into two portions, dimensioned to fit one inside the other for disassembly and convenient storage. The container can be made of collapsible material to occupy only a small space. One or more spreader discs is supported by the container so that a flexible transmission from a power takeoff shaft can be connected to rotate each disc in either direction. Adjusting connections are provided to properly couple the power takeoff to the disc or discs at chosen levels above the ground. A closing regulator is associated with each disc and also can be supported by the container to enable an operator to select both the direction and volume of material being spread. Also, a friction drive instead of a rope or chain transmission can be used to rotate the disc or discs.

6 Claims, 14 Drawing Figures

INVENTORS
ARY VAN DER LELY
CORNELIS JOHANNES GERARDUS BOM
by
Mason, Mason & Albright
Attorneys

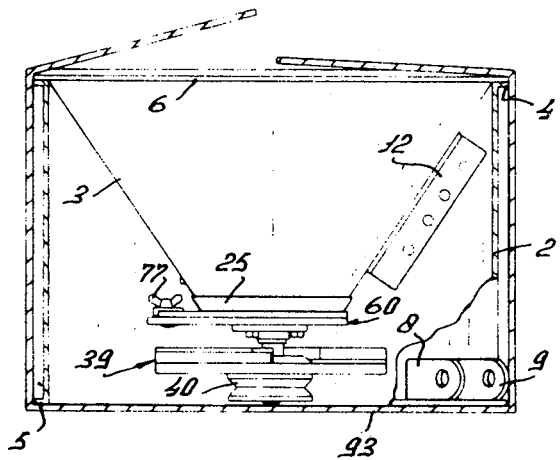
Fig. 6
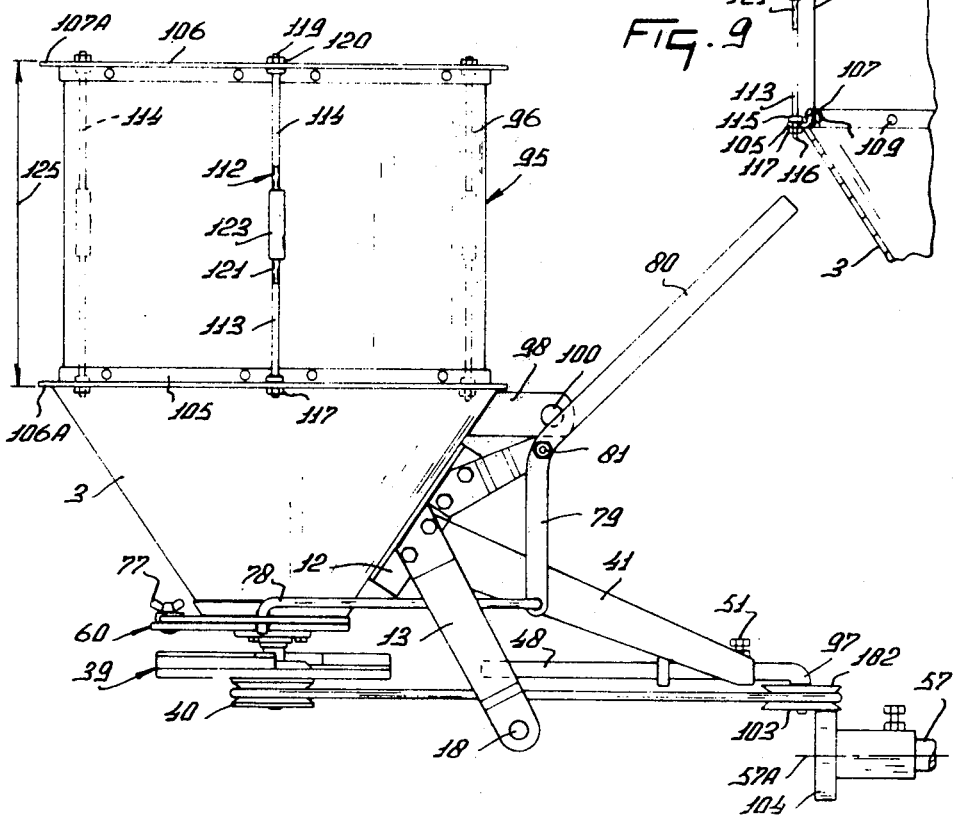
Fig. 8
Fig. 9
INVENTORS
ARY VAN DER LELY
CORNELIS JOHANNES GERARDUS BOM
BY
Mason, Mason & Albright
Attorneys INVENTORS
ARY VAN DER LELY
CORNELIS JOHANNES GERARDUS BOM
by Mason, Mason & Albright
Attorneys

SPREADING IMPLEMENTS

This invention relates to spreading implements of the kind comprising a container for material to be spread and at least one spreading member in communication with transmission elements that are supported from frame parts of the implement.

An object of the invention is the provision of a simple but effective spreading implement of this kind.

According to the invention there is provided a spreading implement of the kind set forth, wherein the transmission elements include a band rope, belt, chain or like flexible member arranged to be placed in driven communication with the power take-off shaft of a tractor or other operating vehicle.

The invention further relates to spreading implements of the kind comprising a container for material to be spread, at least one spreading member and frame parts which carry at least one member for transmitting drive to the spreading member and/or at least one control member, whereby according to the invention, the container has two portions one of which can be arranged substantially wholly inside the other and/or one of which is collapsible for storage and/or transport purposes, whereby the implement can be packed in a volume of space which is small compared with that which it occupies when fully operational.

Figure 2:
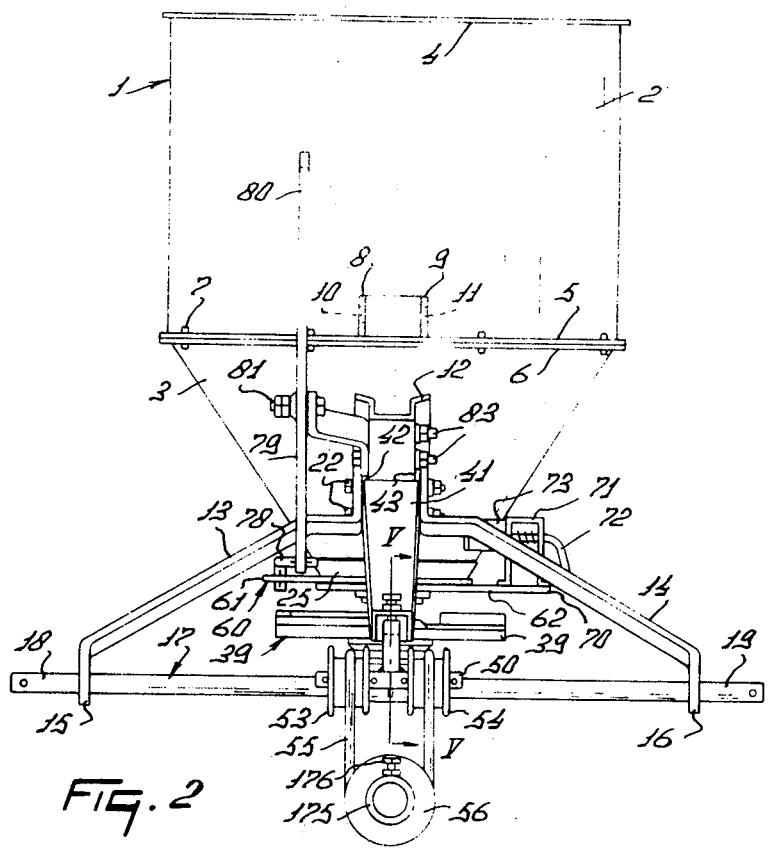
Figure 3:
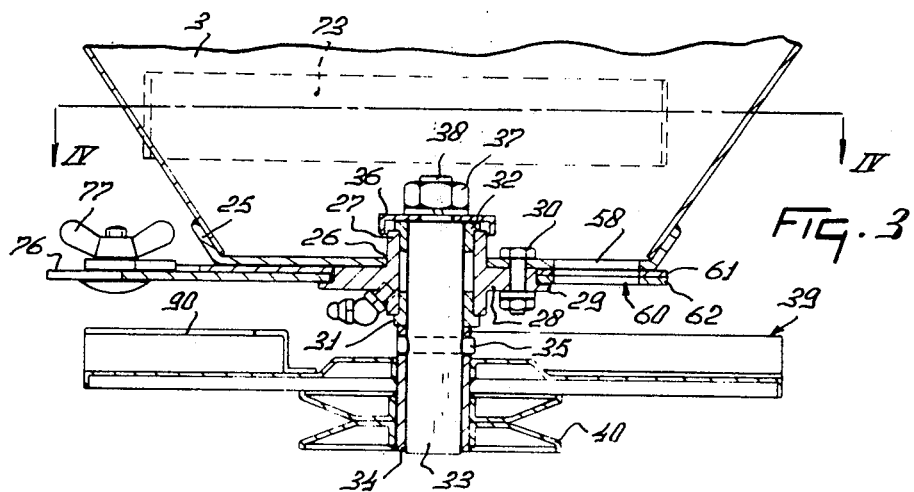
Figure 4:
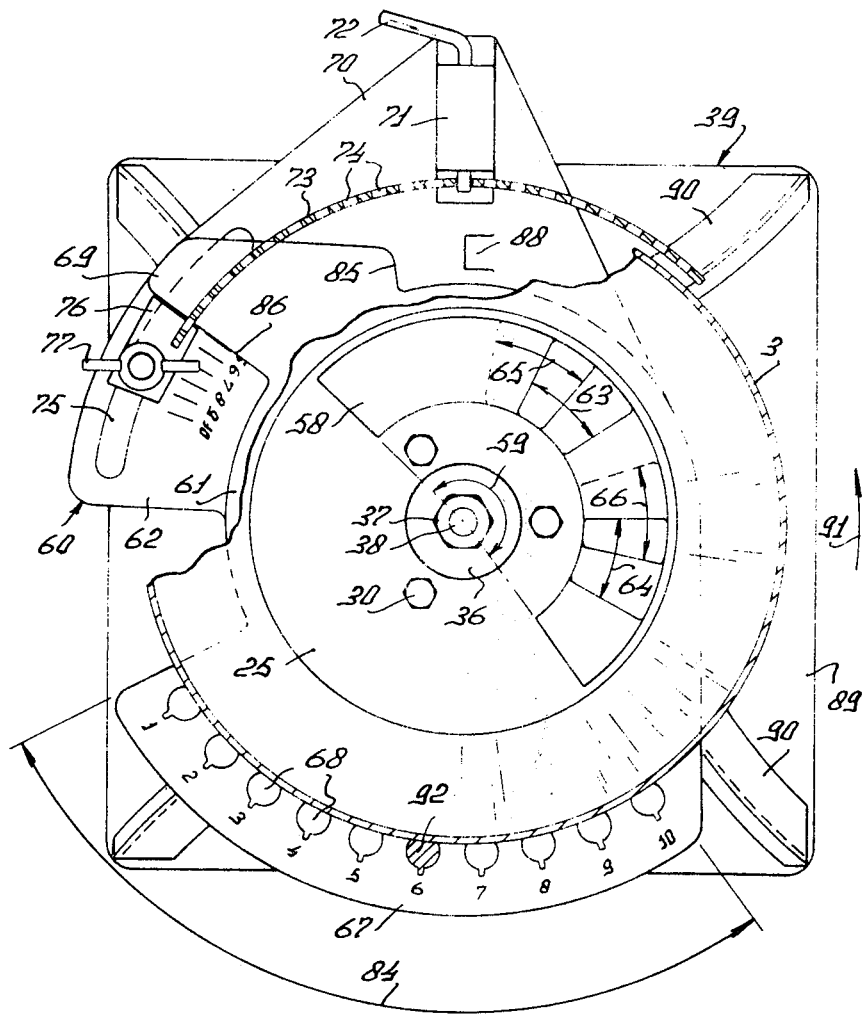
Figure 5:
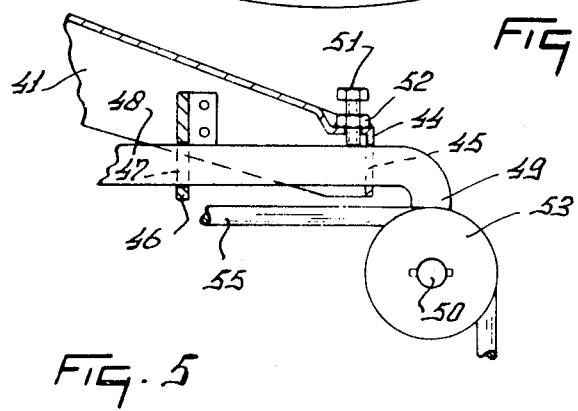
Figure 7:
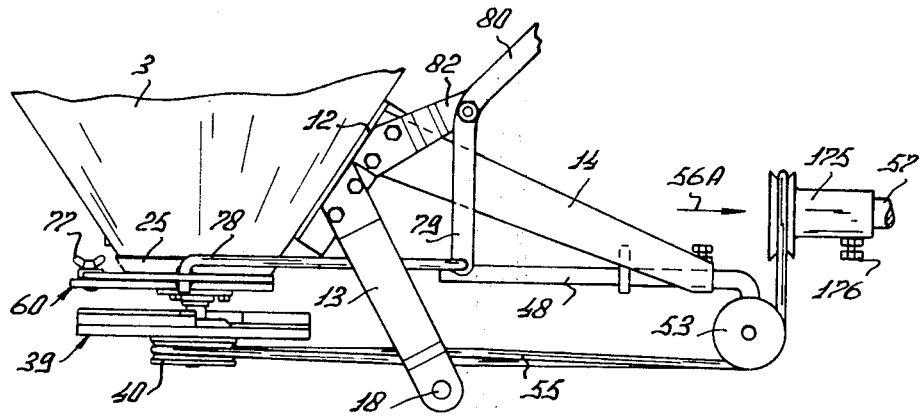
Figure 10:
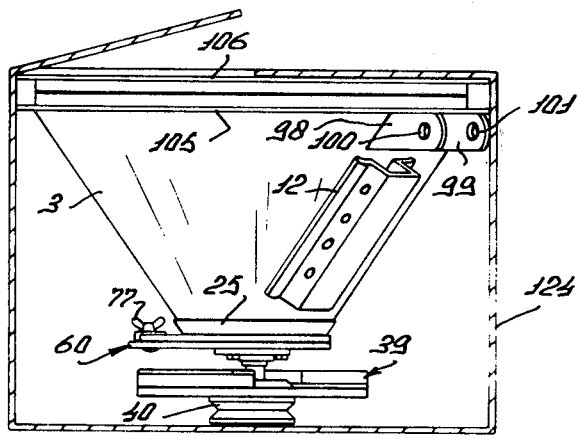
Figure 11:
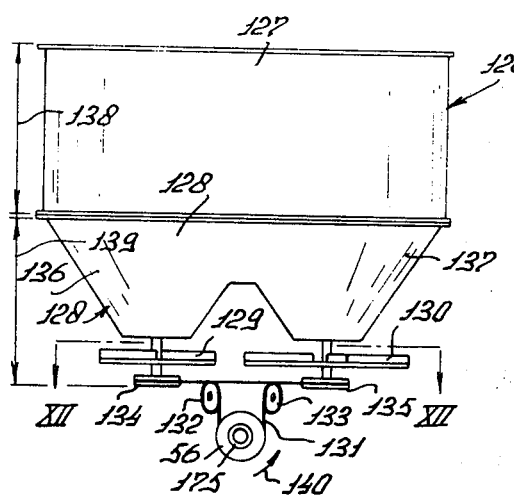
Figure 12:
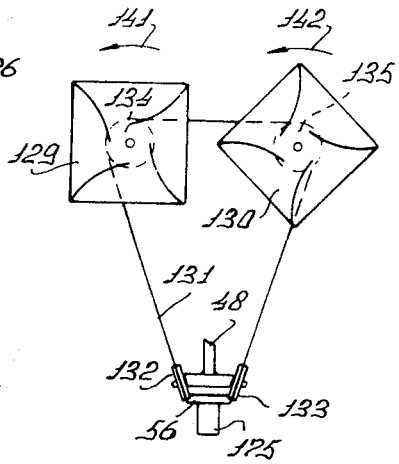
Figure 13:
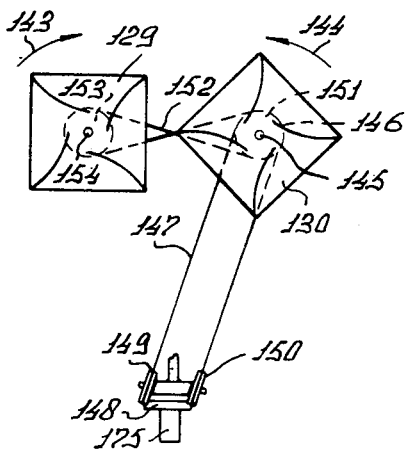
Figure 14:
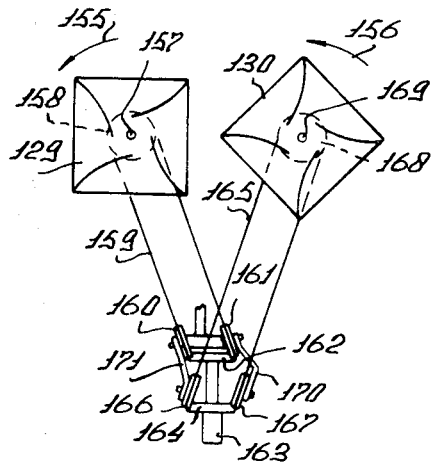

For a better understanding of the invention, and to show how the same may be carried into effect, reference will now be made, by way of example, to the accompanying drawings, in which:

FIG. 1 is a side elevation of a spreading implement in accordance with the invention mounted at the rear of an agricultural tractor, FIG. 2 is a front elevation as seen in the direction indicated by the arrow II of FIG. 1, FIG. 3 is a vertical section, to an enlarged scale, taken through a lower region of the implement in a plane which partially coincides with the line V—V of FIG. 2, FIG. 4 is a sectional plan taken on the line IV—IV of FIG. 3, FIG. 5 is a scrap view showing the arrangement of supports of the implement in greater detail and impartly an elevational view and partly a section taken on the line V—V of FIG. 2, FIG. 6 is a part-sectional elevation showing the implement of FIGS. 1 to 5 packed for transport or storage, FIG. 7 is a side elevation corresponding to FIG. 1, but showing a different position of a drive transmission, FIG. 8 is a side elevation illustrating an alternative spreading implement in accordance with the invention, FIG. 9 is a fragmentary sectional side elevation showing certain parts that can be seen in FIG. 8 in greater detail, FIG. 10 corresponds to FIG. 6 but shows the implement of FIGS. 8 and 9 packed for transport or storage, FIG. 11 is a rear elevation, to a reduced scale, diagrammatically illustrating a further alternative form of spreading implement in accordance with the invention, FIG. 12 is a plan view taken on the line XII—XII of FIG. 11 with certain parts omitted, FIG. 13 corresponds to FIG. 12 but illustrates an alternative arrangement of the drive transmission, and FIG. 14 corresponds to FIGS. 12 and 13 but illustrates another alternative arrangement of the drive transmission.

Referring to FIGS. 1 to 6 of the drawings, the spreading implement which is illustrated may be used for the distribution over the ground of, for example, granular fertilisers, lime, sands, seeds and other similar materials. The implement has a container in the form of a hopper 1 which includes a cylindrical upper portion 2 and a lower inverted frusto-conical portion 3. The upper edge of the upper portion 2 carries an annular ring 4 and the lowermost edge thereof carries a similar annular ring 5. The uppermost edge of the lower portion 3 carries an annular ring 6 which matches the annular ring 5 and the two portions of the hopper 1 are releasably secured to one another by a plurality of small bolts 7 that are entered through aligned holes in the two rings 5 and 6. The circumferences of the three rings 4, 5 and 6 are all the same and the diameter of the upper portion 2 of the hopper 1 is substantially the same as that of the lower portion 3 in the region of the latter which is provided with the ring 6. Two lugs 8 and 9 project horizontally forwards from the upper portion 2 of the hopper 1 immediately above the lowermost annular ring 5 thereof. As can be seen from FIG. 2 of the drawings, the two lugs 8 and 9 are spaced apart from one another horizontally by a short distance and are formed with a pair of horizontally aligned holes 10 and 11. A coupling bracket 12 is fastened to a front region of the wall of the lower portion 3 of the hopper 1 and two arms 13 and 14 are secured to said bracket 12 by transverse bolts 22. As can be seen from FIGS. 1 and 2 of the drawings, the arms 13 and 14 project downwardly from the bracket 12 (and forwardly from said bracket with respect to the intended direction of operative travel of the implement) in such a way as to diverge away from said bracket. The foremost and lowermost free ends 15 and 16 of the two arms 13 and 14 are bent over so as to extend parallel to one another and support a substantially horizontal shaft 17 that is afforded by two separate halves 18 and 19 which are releasably connected to one another at a central junction in a manner which is not illustrated in the drawings. However, the connection may be any simple known one such as, for example, a socket carried by one half which receives the end of the other half, the connection being maintained by a transverse locking pin. The relatively remote ends of the two shaft halves 18 and 19 afford aligned pins to which the lowermost lifting links 21 of a three-point lifting device or hitch can be pivotally connected in the known manner which is illustrated in FIG. 1 of the drawings. The three-point lifting device or hitch is carried at the rear of a vehicle such as an agricultural tractor 23 and the free end of the adjustable upper lifting link 20 of the same three-point lifting device or hitch is pivotally connected to the coupling lugs 8 and 9 by a substantially horizontal pin 24 entered through the aligned holes 10 and 11.

A bottom 25 (FIGS. 1 and 3) is welded or otherwise rigidly secured to the lowermost open edge region of the frusto-conical portion 3 of the hopper 1. The bottom 25 has a central opening 26 inside which a vertical sleeve 27 is arranged. The sleeve 27 is integral with a ring 28 which lies beneath the bottom 25 and which is itself formed with a lowermost circumferential collar 29 of substantially less thickness than the ring 28. Three bolts 30 (FIGS. 3 and 4) are entered through holes in the bottom 25 and the ring 28 to maintain said ring and the sleeve 27 in fixed positions relative to the bottom 25. The sleeve 27 supports a lower bearing 31 and an upper bearing 32, a substantially vertical shaft 33 being rotatably mounted in the bearings and being surrounded, beneath the lower bearing 31, by a sleeve-like hub 34 that is fastened to the shaft 33 by a transverse pin 35. The uppermost end of the shaft 33 has a screw-threaded projection 38 on which is mounted a cap 36 with the aid of a nut 37 and a washer, the cap 36 acting to prevent dust, powder and the like from contaminating the upper bearing 32. A spreading member in the form of an ejector disc 39 is rigidly to the hub 34 beneath the transverse pin 35 and a pulley 40 is, in turn, also secured to the hub 34 beneath the ejector disc 39. The ejector disc 39 is provided with a plurality, such as four, of curved spreading blades 90 which will be referred to again below.

Tongues 42 and 43 disposed at the opposite sides of an end region of a supporting arm 41 are secured to the coupling bracket 12 with the aid of the same bolts 22 that fasten the arms 13 and 14 to that bracket. The opposite end of the supporting arm 41 has a vertical portion 44 in which a square hole 45 is formed. A vertical strip 46 (FIG. 5) is secured to the arm 41 at a short distance rearwardly from the vertical portion 44, said strip 46 being formed with a square hole 47 that is in substantially horizontal alignment with the square hole 45. A bar 48 of square cross-section is entered through both the hole 45 and the hole 47, the foremost end 49 of said bar being bent-over downwardly through 90° and a horizontal shaft 50 having its center secured to the bottom of the bent-over end 49 in such a way that the longitudinal axis of the shaft 50 is substantially parallel to that of the shaft 17. As can be seen best in FIG. 5 of the drawings, a set bolt 51 provided with a lock nut 52 is threaded through a horizontal portion of the arm 41, adjacent the vertical portion 44 of that arm, in such a way that the tip of the shank of the set bolt bears against the flat top of the bar 48 to prevent axial displacement of the bar 48 through the holes 45 and 47. Clearly, axial adjustment of the bar 48 can be effected as required upon temporarily loosening the set bolt 51. Rollers 53 and 54 are rotatably mounted upon the shaft 50 at opposite sides of the bent-over end 49 of the bar 48 and a transmission band 55 of circular cross-section and having a slight degree of elasticity passes through approximately 90° bends around the two rollers 53 and 54, around the pulley 40 and around a further pulley 56 mounted upon the power take-off shaft 57 of the agricultural tractor 23.

The pulley 56 has a hub 175 which is secured to the power-take-off shaft 57 with the aid of a set bolt 176 so that said pulley 56 will rotate reliably with the shaft 57 about the substantially horizontally disposed longitudinal axis 57A of that shaft.

An outlet port 58 (FIG. 4) is formed through the hopper bottom 25 and subtends an angle 59 at the substantially vertical axis of rotation of the shaft 33 of about 190°. Flow control or dosing mechanism 60 (FIGS. 1 to 3) is arranged immediately beneath the hopper bottom 25 and comprises upper and lower apertured discs 61 and 62 both of which are turnable about the ring 28 relative to the hopper 1. As can be seen in FIG. 3 of the drawings, inner edge regions of the two annular discs 61 and 62 are sandwiched between the hopper bottom 25 and the collar 29 that is integral with the ring 28. The lower disc 62 is adjustable in position around the substantially vertical axis of the shaft 33 and acts principally to determine the angular setting around that axis at which material from the hopper 1 leaves that hopper to fall onto the ejector disc 39 for centrifugal ejection thereby. It will be realised that this angular setting is the principal factor in determining the direction of ejection of material from the implement relative to the path of travel thereof. The disc 61, on the other hand, acts to determine the volume of material per unit time which reaches the ejector disc 39 from the hopper 1 and thus the quantity of material spread per unit area traversed by the implement assuming a substantially constant speed of travel. The lower disc 62 is formed with two outlet openings 65 and 66 both of which are in register with the outlet port 58 while the upper disc 61 is formed with two similar outlet openings 63 and 64 both of which are also in register with the outlet port 58 while the upper disc 61 is formed with two similar outlet openings 63 and 64 both of which are also in register with the outlet port 58. The upper disc 61 has an integral projection 67 which subtends an angle 84 (FIG. 4) of about 90° at the axis of the shaft 33. The projection 67 is formed with a curved row of 10 holes 68 each of which is indicated by a corresponding numeral between "1" and "10" inclusive. A stop 69 is also integral with the upper disc 61 and is shaped in the manner which can be seen best in FIG. 4 of the drawings which is such that the stop presents a short radial stop edge 85 and a longer radial stop edge 86.

The lower disc 62 is formed with an integral projection 70 on top of which a bracket 71 is mounted, the bracket 71 supporting a spring-loaded horizontal locking pin 72. The tip of the locking pin 72 can co-operate with any one of a number, such as 20, of holes 74 that are formed in a row through an arcuately curved strip 73. The strip 73 is secured to the conical wall of the lower hopper portion 3 and subtends an angle of about 90° at the substantially vertical axis of the shaft 33. A curved slot 75, whose center of curvature is also coincident with the axis 33 is formed through the projection 70 and a slider 76 is mounted in the slot 75 in such a way that it can be moved therealong to any chosen position. The slider 76 incorporates a bolt and wing nut 77, the latter being arranged so that it can be tightened as required to retain the slider 76 at any chosen position along the slot 75. An upstanding stop 88 is formed on the upper surface of the projection 70 in the path of the short stop edge 85. The downwardly bent-over end 92 of a connecting rod 78 is entered through any chosen one of the holes 68 in the projection 67, the hole marked by the numeral "6" being the chosen one as illustrated in FIG. 4 of the drawings. The opposite end of the connecting rod 78 is pivotally connected to the lower end 79 of a setting arm 80 which arm takes the form of a lever that is turnable about a fulcrum afforded by a substantially horizontal bolt 81 mounted at the offset upper free end of a support 82 that is secured to the coupling bracket 12 by a pair of bolts 83.

In the use of the spreading implement which has been described, it is mounted upon the three-point lifting device or hitch of a vehicle such as the agricultural tractor 23 in the manner which has previously been described and which can be seen in outline in FIG. 1 of the drawings. The lower hopper portion 3 also acts as a supporting portion of the implement and indirectly carries the flow control or dosing mechanism 60, the shaft 33, the ejector disc 39 and the pulley 40. The frame parts by which the implement is connected to the three-point lifting device or hitch are secured to the hopper portion 3, with the exception of the lugs 8 and 9, and said hopper 3 itself takes the place of some of the supporting frame parts that are required in known spreading implements of the same general kind.

The ejector disc 39 is driven in a simple manner from the power take-off shaft 57 and it will be realised that the band 55 can be tensioned around the pulleys 40 and 56 and the rollers 53 and 54 by raising the three-point lifting device or hitch of the tractor 23 to an appropriate level. The ejector disc 39 will rotate in an anticlockwise direction (as seen in plan) when the power take-off shaft 57 and pulley 56 rotate in a clockwise direction as viewed in the direction of the arrow 56A shown in FIG. 1 of the drawings.

The transmission ratio can be changed by using pulleys 56 of different diameters and the band 55 is maintained in a taut condition by sliding the bar 48 through the holes 45 and 47 as may be required first loosening, and subsequently re-tightening, the set bolt 51.

As the tractor 23 or other vehicle moves the implement over the ground, the granular fertiliser or other powdered or granular material in the hopper 1 passes from that hopper to the rotating ejector disc 39 by way of the outlet port 58 and the four outlet openings 63 to 66. The ejector disc 39 takes the form of a substantially square plate 89 upon the upper surface of which the previously mentioned spreading blades 90 are mounted, there being, in the embodiment which is being described, four such blades 90 are arranged so that their radially outermost ends are disposed at the four corners of the square plate 89. Each blade 90 is of curved configuration and it can be seen from FIG. 4 of the drawings that the concave side of each blade 90 is located foremost with respect to the intended direction of rotation 91 of the ejector disc 39.

The quantity of material per unit time which reaches the ejector disc 39 from the hopper 1 can be changed by turning the two discs 61 and 62 relative to one another to increase or decrease the degree of overlap between the outlet openings 63, 64 and the outlet openings 65, 66. The relative adjustment is effected by turning the setting arm 80 about the pivot bolt 81, it being noted from FIG. 1 of the drawings that the arm 80 projects forwardly towards the driving seat of the tractor 23 to a position in which it can be operated by the driver of the tractor without leaving his seat. If the disc 61, to which the arm 80 is connected by way of the rod 78, is turned to a position in which the short stop edge 85 comes into contact with the stop 88 on the projection 70 of the disc 62, then the openings 63 and 64 will be completely out of register with the openings 65 and 66 respectively so that the flow of material from the hopper 1 to the ejector disc 39 will be wholly discontinued. The outlet openings can be caused to overlap to any desired extent up to a maximum in which they are in complete register with one another by turning the setting arm 80 about the pivot bolt 81 until the longer stop edge 86 of the stop 69 comes into abutting contact with one end of the slider 76, the position of said slider 76 along the slot 75 being adjustable and said slider 76 being the part which is adjusted prior to any particular spreading operation to dictate the desired rate of flow for that operation. It will be noted that a scale reading from "0" to "10" is marked on the projection 70 alongside the slot 75 and that part of the longer stop edge 86 is movable over this scale. The position 0 on the scale indicates that the outlet openings are completely closed while the position 10 on the scale indicates that they are open to their maximum possible extent. When the slider 76 is set at any particular position along the scale by tightening the wing nut 77, the setting arm 80 will then be turnable by the driver of the tractor 23 between the chosen position and a position in which there is no flow of material from the hopper to the ejector disc 39. Thus, the flow can be discontinued whenever required and recommenced at exactly the originally determined rate, without re-adjustments, merely by the movement of the single setting arm 80. The particular shape and arrangement of the outlet openings 63 to 66 which has been described and illustrated is not essential and it will be realised that other shapes and relative dispositions of these openings may be adopted if preferred.

The general direction in which the material is spread from the implement with respect to the path of travel thereof is adjusted by turning the two discs 61 and 62, in common, about the axis of the shaft 33. This is effected by withdrawing the tip of the locking pin 72 from the particular hole 74 in which it is located and turning the two discs 61 and 62 until the desired position is reached. The tip of the pin 72 is then entered in that hole 74 which is closest to the required position. It will be appreciated that the large number of holes 74 in the extensive strip 73 makes a large range of adjustment available. In order to ensure that the setting arm 80 will still be readily accessible to the driver of the agricultural tractor 23 after an adjustment of the kind just described has been made, the end 92 of the connecting rod 78 can be re-positioned in that one of the holes 68 which results in the most comfortable and convenient disposition of the arm 80.

When the implement is to be stored for some length of time and when it is to be transported from one place to another, such as from a factory or warehouse to a customer, it can be packed in a small volume of space in the manner which is shown in outline in FIG. 6 of the drawings. It can be seen from this Figure that the relative dimensions of the hopper portion 2, hopper portion 3, ejector disc 39 and flow control or dosing mechanism 60 are such that the hopper portion 2 can contain the other parts just mentioned inside itself with said parts remaining in their assembled condition. The height 2A of the hopper portion 2 is substantially equal to the height 3A of the assembled hopper portion 3, ejector disc 39, pulley 40 and flow control or dosing mechanism 60.

Packing of the implement in a box such as the box 93 shown in FIG. 6 of the drawings is accomplished by temporarily removing the small bolts 7, placing the assembly which includes the hopper portion 3 inside the hopper portion 2 as shown in FIG. 6, replacing the small bolts 7 through registering holes in the ring 6 and in the ring 4 and subsequently tightening said bolts 7 to maintain a rigid condition. The lugs 8 and 9 project into a corner of the box 93 but it will be realised that the various frame parts which project appreciably beyond the hopper 1 will need to be disconnected therefrom before packing. To this end, the bolts 22 and 83 are withdrawn whereupon the arms 13 and 14 together with the two halves 18 and 19 of the shaft 17, the support 82, the setting arm 80, the supporting arm 41, the bar 48 and the rollers 53 that are connected thereto can be disposed either in the space between the frusto-conical wall of the hopper portion 3 and the inside of the cylindrical hopper portion 2 or, like the lugs 8 and 9, in the spaces in the four corners of the square or rectangular box 93 that are left between the external surface of the hopper portion 2 and the internal surfaces of the box. The simple construction of the implement is possible primarily because the hopper portion 3 thereof itself acts as a support for the underlying mechanism 6 and ejector disc 39 and effectively replaces many of the frame parts which are required in known spreading implements of the same general kind. Most of the weight of the loaded implement is supported from the three-point lifting device or hitch of the agricultural tractor 23 or other vehicle by way of the arms 13 and 14 which arms are indirectly connected to the frusto-conical hopper portion 3. The various disconnected frame parts that have been mentioned above are not shown in FIG. 6 of the drawings but it will be realised that they will be shaped and dimensioned so that they can be packed in the box 93 without difficulty. The box 93 may be made from strong cardboard, from wood, or from synthetic plastics materials and may, if desired, be other than square or oblong when seen in plan.

FIG. 7 of the drawings illustrates a different arrangement for the drive transmission of the implement in which said implement is located at a lower level relative to that of the power take-off shaft 57 of the tractor, the level being such that the height of the pulley 40 above the ground is much less than the height 40A shown in FIG. 1 of the drawings. The lower level arrangement illustrated in FIG. 7 is more suitable for distributing certain materials and can be more appropriate for use when certain operating conditions prevail. As can be seen in FIG. 7 of the drawings, the power take-off shaft 57 is located above the rollers 53 and 54 and, since the shaft 57 still rotates in a clockwise direction as seen in the direction of the arrow 56A, the band 55 has to be crossed between the pulley 40 and the rollers 53 and 54 to maintain the required direction of rotation of the disc 39. It is, in fact, possible to use a disc 39 of a kind that can be rotated in either direction to produce a satisfactory pattern of spread of the material and it will be realised that, when such a disc is employed, crossing of the band 55 will be unnecessary. However, readjustment of the positions of the discs 61 and 62 around the longitudinal axis of the shaft 33 will almost always be required when the direction of rotation of said shaft 33 is reversed. It will be evident that the change-over in position of the implement from the position shown in FIG. 1 to the position shown in FIG. 4 and vice-versa can be accomplished quickly and easily by virtue of the simple formation of the transmission elements that are employed. When the transmission band 55 is arranged in the manner shown in FIG. 7 of the drawings, it will be realised that there will be some rubbing at the crossing point between the pulley 40 and the rollers 53 and 54. Such rubbing is, generally speaking, undesirable and it can be avoided by crankling or otherwise offsetting the shaft 50 to a small extent sufficient to ensure that the axes of rotation of the rollers 53 and 54 are no longer coincident and are not contained in the same horizontal plane. There will then be a sufficient degree of clearance to avoid rubbing at the point at which (as seen in plan) the two portions of the band 55 that lie between the pulleys 40 and the rollers 53 and 54 cross one another.

The arrangement of the implement as shown in FIG. 7 of the drawings is also advantageous when the power take-off shaft 57 of the particular tractor employed is at a relatively high level above the ground surface. It will be appreciated that a satisfactory level of the implement for any particular tractor can be produced by employing a transmission band, rope or the like 55 of an appropriate length, fine adjustments in the tension of the band being made by raising or lowering the links of the three-point lifting device or hitch as required and/or by making longitudinal adjustments of the bar 48.

The spreading implement which is shown in FIGS. 8, 9 and 10 of the drawings includes a number of parts which are similar, or identical, in construction and function to parts that have already been described with reference to FIGS. 1 to 6. Accordingly, such parts will not be described again and are indicated in FIGS. 8 to 10 of the drawings by the same reference numerals as are employed in FIGS. 1 to 6. In this embodiment, a container in the form of a hopper 95 has an upper cylindrical portion 96 which is different in construction to the previously described upper portion 2 while the lower portion of said hopper 95 is of substantially identical construction to the previously described lower portion 3. It differs in that a pair of lugs 98 and 99 formed with horizontally aligned holes 100 and 101 project from its frusto-conical wall adjacent the uppermost edge of that wall, said lugs 98 and 99 serving the same purpose as the lugs 8 and 9 that are connected to the upper hopper portion 2 in the first embodiment. In this embodiment, the bar 48 has a loading downwardly bent-over end 97 which affords a substantially vertical stub shaft upon which a pulley 102 is rotatably mounted. The lower surface 103 of the pulley 102 is arranged to be placed in driven engagement with a frictional driving disc 104 whose hub is fastened to the power take-off shaft 57 of the agricultural tractor or other vehicle 23 so as to be rotated about the substantially horizontal axis of rotation 57A of that shaft.

A transmission band, rope, V-belt or the like drivingly interconnects the pulleys 102 and 40, it being possible to urge the surface 103 of the pulley 102 against the frictional driving disc 104 with sufficient pressure by adjusting the three-point lifting device or hitch to which the implement is connected until an appropriate level is reached. If desired, the pulley 102 may be rotatably mounted on the downwardly bent-over end 97 of the bar 48 in such a way that it is urged resiliently into engagement with the frictional driving disc 104. To this end, a helical compression spring may surround the end 97 and bear between the 90° junction of that end with the remainder of the bar 48 and an appropriate bearing member carried by the upper surface of the pulley 102. Provided that the pulley 102 is movable vertically to a small extent along the end 97, spring-loaded engagement between the surface 103 of the pulley 102 and the driving disc 104 will result. When this construction, the transmission band, rope, belt or the like may be appropriately tensioned by longitudinal adjustment of the bar 48 after loosening the set bolt 51, which is subsequently retightened. If necessary, the hub of the driving disc 104 can also be displaced lengthwise of the power take-off shaft 57 to some extent. It will be realised that, with this construction, the pulleys 40 and 102 could readily be replaced by sprocket wheels drivingly interconnected by an endless transmission chain.

A ring 105 of L-shaped cross-section is secured to the uppermost edge of the lower hopper portion 3, said ring 105 affording a lower ring of the upper hopper portion 96. A second upper ring 106 of the same cross-section is arranged at the upper edge of the upper hopper portion 96. Cylindrical rings 107 and 108 (FIG. 9) are arranged internally of the vertical limbs of the rings 105 and 106 respectively and are secured thereto by small radially disposed horizontal bolts 109 and 110 respectively. The lowermost edge region of a flexibel cylindrical jacket 111 is clamped between the rings 105 and 107 while the uppermost edge region of said jacket 11 is similarly clamped between the rings 106 and 108. The jacket 111 is made from a flexible material such as rubber, synthetic rubber, canvas or other textile material or a synthetic plastics material such, purely for example, as polyethylene. The material should be one that can be tightly folded without suffering deterioration. The two rings 105 and 106 are maintained in vertically spaced apart relationship to keep the jacket 111 taut by a number of spacing rods 112 each of which comprises two portions 113 and 114. The lower portion 113 has, at its lowermost end, a fixed ring 115 beyond which there is a screw-threaded projection 116 carrying a nut 117. The upper end of the upper portion 114 is similar carrying a fixed ring 118 above which there is a screw-threaded projection 119 upon which a nut 120 is mounted. The neighbouring ends of the two rod portions 113 and 114 are formed with screw-threads 121 and 122 that are left- and right-hand screw-threads respectively. These screw-threaded portions 121 and 122 are entered into the opposite ends of a sleeve 123 which opposite ends are themselves formed with co-operating left-hand and right-hand screw-threads. The arrangement is, of course, such that rotating the sleeve 123 in one direction will cause the two rod portions 113 and 114 to be drawn closer towards one another whilst rotating it in the opposite direction will cause said rod portions to be moved further away from one another. The arrangement is also such that the two rod portions 113 and 114 can be brought as close to one another that the length of the whole rod 112 between its opposite ends will be slightly less than the perpendicular distance 125 between the horizontal limb 106A of the ring 105 and the horizontal limb 107A of the ring 106. One of the rods 112 can thus be easily removed while maintaining the jacket 111 substantially taut merely by undoing the nuts 117 and 120 and shortening said rod by rotating the corresponding sleeve 123 in an appropriate direction. It will be realised that it is not absolutely essential to provide the nuts 117 and 120 since tautness of the jacket 111 is maintained by the pressures of the rings 115 and 118 against the horizontal limbs 106A and 107A of the two rings 105 and 106. However, it is preferred to provide the nuts 117 and 120 to avoid the spacing rods 112 becoming accidentally lost.

When the implement is in use, the jacket 111 is maintained in a taut condition by the spacing rods 112. However, during transport or storage of the implement, the nuts 117 and 120 are temporarily removed from the rod portions 113 and 114 and the rods 112 are released from the rings 105 and 106 by shortening them in the manner described above with the aid of the sleeves 123. Once the rods 112 are removed, the upper ring 106 can be moved downwardly to lie on top of the lower ring 105 in the manner which can be seen in FIG. 10 of the drawings, the folded jacket 111 being disposed wholly or principally within the interior of the lower hopper portion 3. Once folding of the jacket 111 has been accomplished, the implement can be stored inside a box such as the box 124 shown in FIG. 10. It will be realised that the height 125 of the upper hopper portion 96 can be chosen as required without significantly changing the dimensions of the implement when it is packed away in the box 124 as shown in FIG. 10. The spacing rods 112 will, of course, be dimensioned to give the required height 125 and can be stored within the box 124 with the other frame parts as has previously been described with reference to FIGS. 1 to 6 of the drawings. It will be remembered that, if required, each spacing rod 112 can be substantially halved in length for storage purposes merely by unscrewing either the portion 113 or the portion 114 thereof from the sleeve 123.

The box 124 preferably has dimensions which are such that the upper edge of the lower hopper portion 3 is substantially immovably enclosed by the box. To this end, the box 124 may have a square, oblong, polygonal or circular shape when seen in plan, said shape depending to a large extent upon the chosen dimensions of the arms 13 and 14, the supporting arm 41, the spacing rods 112 and other parts. The construction of the implement is again such that it can be packed into the box 124 and then occupy a relatively small volume of space, compared with that which it occupies when in its fully operational condition. That is, clearly, a considerable advantage to the manufacturer, storage contractor, wholesaler, retailer and customer. The volume of space occupied by the implement when packed in the box 124 is, in fact, considerably less than half that which it occupies when fully operational. The implement can be taken apart for clearing, repair or maintainance with great ease and its simple construction combines with the small volume of space which it occupies when in a non-operational condition in producing an effective implement whose price can be lower than that of conventional implements of the same general kind.

FIGS. 11 and 12 illustrate an alternative construction in which the container is afforded by a hopper 126 having an upper substantially vertical-walled portion 127 and a lower portion 128 formed with two inverted frusto-conical parts 136 and 137. In this case, the spreading member comprises two separate ejector discs 129 and 130 which are again arranged to be driven from the power take-off shaft of a co-operating agricultural tractor or other vehicle by way of the pulley 56 mounted on that shaft with the aid of its hub 175, a transmission band 131, two relatively inclined guide rollers or pulleys 132 and 133 and two pulleys 134 and 135 mounted at the lowermost ends of the substantially vertical shafts to which the ejector discs 129 and 130 are secured. The two discs 129 and 130 are respectively arranged beneath the two frusto-conical parts 136 and 137 of the lower hopper portion 128. Flow control or dosing mechanism similar to the previously described mechanism 60 is provided for each of the two parts 136 and 137 and the two discs 129 and 130 and the pulleys 134 and 135 are connected to shafts corresponding to the shafts 33 in substantially the same way as has been briefly described with reference to FIGS. 1 to 3 of the drawings. Repetition of this description is therefore superfluous.

The upper hopper portion 127 may be formed from metal and/or a synthetic plastics material and has a height 138 which is approximately equal to the height 139 between the upper edge of the lower hopper portion 128 and the lowermost ends of the two shafts to which the pulleys 134 and 135 are secured. Once again, the lower hopper portion 128, together with the parts which it supports, can be arranged inside the surrounding upper hopper portion 127, the whole implement then being disposed within a suitably proportioned box. As an alternative, the rigid upper hopper portion 127 can be replaced by a foldable assembly constructed in a similar manner to that described with reference to FIGS. 8 to 10 of the drawings. The flexible wall of the upper hopper portion will then be folded downwardly into the rigid lower hopper portion 128 in a more or less zig-zag fashion. The various frame parts that are employed for coupling the implement to a tractor or other operating vehicle and for other purposes can, once again, be arranged inside the box, chest or other packing that receives the implement for transport and storage purposes. The volume of space occupied by the implement when packed is, once again, very much less than the volume of space which it occupies when fully operational. Although the idea of invention to make the hopper from two parts as mentioned herebefore has been described in its application to spreading implements arranged for mounting upon the three-point lifting devices or hitches of agricultural tractors and other vehicles, it will be apparent that the invention can also be applied to implements that are supported by ground wheels to effect a considerable reduction in the volume of space occupied by the implement when packed for transport or storage as compared with the volume of space which it occupies when fully operational. Moreover, by this idea of the invention, simple transmission bands are described for driving the spreading members of the implements illustrated in the accompanying drawings but it will be evident that other transmission members such as chains and sprocket wheels, toothed pinions and the like can equally well be employed.

When the power take-off shaft 57 rotates in the direction of an arrow 140 shown in FIG. 11 of the drawings, the two ejector discs 129 and 130 will rotate in the directions of the arrow 141 and 142 that are shown in FIG. 12 of the drawings, these directions being the same. The flow control or dosing mechanisms 60 that are associated with the two ejector discs 129 and 130 may, for example, be arranged in such a way that one disc spreads material from the hopper 126 principally to one side of the path of travel of the tractor which supports the implement while the other ejector disc spreads material principally to the opposite side of said path of travel.

FIG. 13 shows an alternative arrangement for the drive transmission of a spreading implement having two ejector discs of the general kind illustrated in FIG. 11. In this case, the ejector disc 129 rotates about the axis of its driving shaft 154 in the direction of an arrow 143 while the ejector disc 130 rotates about the axis of its driving shaft 145 in the direction of an arrow 144. A transmission band, rope or the like 147 is passed around a pulley 148 carried by the power take-off shaft 157, around two guide rollers or pulleys 149 and 150 and around a pulley 146 secured to the driving shaft 145 of the disc 130. It will be noted that the two guide rollers or pulleys 149 and 150 are both inclined in the same direction towards the pulley 146. The shaft 145 carries a second pulley 151 and the driving shaft 154 carries a pulley 153, the pulleys 146, 151 and 153 being of the same size. A transmission band, rope, belt or the like 152 drivingly interconnects the pulleys 151 and 153 and it will be seen from FIG. 13 of the drawings that said band, rope, belt or the like 152 is crossed to ensure that the two directions of rotation 143 and 144 are opposite to one another. It will be readily apparent that the rollers or pulleys 149 and 150 may be rotatably connected to parts that are adjustable relative to an arm corresponding to the previously decribed supporting arm 41.

FIG. 14 illustrates a further alternative arrangement with the aid of which the two ejector discs 129 and 130 of a spreading implement, such as that illustrated in FIG. 11, may be driven. In this case, the two discs 129 and 130 are arranged to rotate in the same directions as are indicated by the arrows 155 and 156 in FIG. 14. The ejector disc 129 is fastened to a substantially vertical shaft 157 to which is also secured a pulley 158. Similarly, the disc 130 is fastened to a substantially vertical shaft 169 which also carries a pulley 168. A transmission band, rope, belt or the like 159 passes around the pulley 158, around two guide rollers or pulleys 160 and 161 and around a pulley 162, the last-mentioned pulley being secured to the power take-off shaft 163 of an agricultural tractor or other operating vehicle. The power take-off shaft 163 is provided with a second pulley 164 around which a transmission band, rope or belt 165 is taken. The belt, rope or band 165 also passes around two guide rollers or pulleys 166 and 167 and around the pulley 168 that is fastened to the shaft 169. It will be seen from FIG. 14 of the drawings that both the rollers or pulleys 160 and 161 and the rollers or pulleys 166 and 170 are rotatably mounted upon two brackets 170 and 171, said brackets 170 and 171 being shaped in such a way that the two rollers or pulleys 160 and 161 are aligned towards the pulley 158 whilst the two rollers or pulleys 166 and 167 are aligned towards the pulley 168. It will be realised that the brackets 170 and 171 may be secured to an adjustable bar substantially corresponding to arrangement to that of the previously described bar 48.

In the embodiments of FIGS. 11 to 14 of the drawings, a simple transmission is again obtained between the power take-off shaft of a tractor or other operating vehicle and the spreading member of the implement. The simplicity is generally obtained by securing a pulley to the power take-off shaft and using transmission bands, ropes, belts or the like in conjunction with co-operating pulleys and/or rollers or by using a transmission chain and sprocket wheels. The distance between the spreading member and the driving pulley that is secured to the power take-off shaft is traversed without difficulty by an elongated band, rope, belt or chain so that said distance does not necessitate any complicated constructional requirements. A spreading implement in accordance with the invention may therefore be simple in construction and cheap in price while routine maintenance and the replacement of any worn or damaged parts can be carried out without difficulty.

Having thus described my invention, what I claim as new and desire to secure by Letters Patent of the U.S. is:

1. A spreading implement comprising a hopper with supporting frame parts and at least one rotatable spreading member mounted beneath an outlet in said hopper, said hopper having an upper part and a lower part detachably connected to each other, said upper part having coupling means with which the implement is connectable to an upper arm of a three-point lifting device of a tractor, said rotatable spreading member being mounted on a vertical shaft rotatably and entirely supported in said lower part with a dosing mechanism positioned between said hopper and said spreading member, at least two supporting members being detachably connected to said lower part to connect the implement to the lower arms of a three-point lifting device of a tractor, a transmission for driving said spreading member, said transmission including connecting means to connect the transmission to the power take-off of a tractor, and comprising flexible endless means connecting said spreading member to said connecting means and the power take-off, said connecting means comprising guide means for said flexible endless means and being supported by said hopper on frame members detachably connected to said lower part of said hopper whereby said hopper parts and said frame members can be separated and the implement conveniently stored.

2. An implement as claimed in claim 1, wherein said guide means is movably mounted on said frame members and displaceable to various positions at different distances from said spreading member.

3. An implement as claimed in claim 1, wherein said transmission means includes a pulley with a surface placed in driven engagement with a frictional driving disc on the power takeoff shaft.

4. An implement as claimed in claim 3, wherein said pulley is resiliently mounted on one of said frame members to be urged into engagement with said frictional driving disc during operation of said implement.

5. An implement as claimed in claim 1, wherein one of said hopper parts is positionable substantially wholly inside the other part and said frame members are detachable from said hopper whereby the entire implement can be crated in a box having approximately the same dimensions as either of said portions.

6. An implement as claimed in claim 5, wherein the dimensions of said container parts and those of said box permit some of said frame parts to be accommodated inside said one part and the remaining frame parts to be arranged adjacent said other part and inside said box.

* * * * *